(12) United States Patent
Ogawa et al.

(10) Patent No.: US 9,688,142 B2
(45) Date of Patent: Jun. 27, 2017

(54) CLUTCH CONTROL DEVICE FOR 4-WHEEL DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/117,914

(22) PCT Filed: Feb. 24, 2015

(86) PCT No.: PCT/JP2015/055250
§ 371 (c)(1),
(2) Date: Aug. 10, 2016

(87) PCT Pub. No.: WO2015/129695
PCT Pub. Date: Sep. 3, 2015

(65) Prior Publication Data
US 2016/0355089 A1 Dec. 8, 2016

(30) Foreign Application Priority Data

Feb. 27, 2014 (JP) ................................ 2014-036446

(51) Int. Cl.
*B60K 23/08* (2006.01)
*B60K 17/344* (2006.01)
(Continued)

(52) U.S. Cl.
CPC .............. *B60K 23/08* (2013.01); *B60K 17/02* (2013.01); *B60K 17/344* (2013.01); *F16D 21/00* (2013.01);
(Continued)

(58) Field of Classification Search
None
See application file for complete search history.

(56) References Cited

U.S. PATENT DOCUMENTS

| | | | |
|---|---|---|---|
| 8,469,854 B1 * | 6/2013 | Downs | B60K 23/08 475/221 |
| 9,108,512 B2 | 8/2015 | Imafuku | |

(Continued)

FOREIGN PATENT DOCUMENTS

| | | |
|---|---|---|
| CN | 103153674 A | 6/2013 |
| CN | 103442922 A | 12/2013 |

(Continued)

*Primary Examiner* — Justin Holmes
(74) *Attorney, Agent, or Firm* — Global IP Counselors, LLP

(57) ABSTRACT

A clutch control device is provided for a four-wheel drive vehicle for transmitting drive force to the rear wheels. The clutch control device includes a dog clutch and a friction clutch, and a controller that controls the dog clutch and the friction clutch. The controller starts the engagement of the dog clutch, after placing the dog clutch in a rotationally synchronized state by engaging the friction clutch and increasing an output rotation thereof, when there is a request to engage the dog clutch. In this clutch control device, the controller sets the engagement start timing of the friction clutch when a transition is made to the connected, four-wheel drive mode to an earlier timing compared to when a transition is made to the standby two-wheel drive mode, when there is a request to engage the dog clutch while in a state in which the disconnected, two-wheel drive mode is selected.

14 Claims, 7 Drawing Sheets

(51) Int. Cl.
  *F16D 25/0638*  (2006.01)
  *B60K 17/02*  (2006.01)
  *F16D 21/00*  (2006.01)
  *F16D 48/00*  (2006.01)

(52) U.S. Cl.
  CPC ......... *F16D 25/0638* (2013.01); *F16D 48/00* (2013.01); *B60K 2023/0825* (2013.01); *B60K 2023/0833* (2013.01); *F16D 2300/02* (2013.01)

(56) References Cited

U.S. PATENT DOCUMENTS

| | | | |
|---|---|---|---|
| 9,352,647 B2 | 5/2016 | Ibusuki | |
| 2011/0275470 A1* | 11/2011 | Ekonen | B60K 17/35 475/198 |
| 2014/0190758 A1* | 7/2014 | Osborn | B60K 17/3462 180/364 |

FOREIGN PATENT DOCUMENTS

| | | |
|---|---|---|
| EP | 2 105 336 A2 | 9/2009 |
| EP | 2 308 711 A1 | 4/2011 |
| JP | 2002-370557 A | 12/2002 |
| JP | 2004-9954 A | 1/2004 |
| JP | 2009-269605 A | 11/2009 |
| JP | 2010-100280 A | 5/2010 |
| JP | 2010-254058 A | 11/2010 |
| JP | 2011-143790 A | 7/2011 |
| JP | 2012-61923 A | 3/2012 |
| WO | 2012/146785 A1 | 11/2012 |
| WO | 2013/093978 A1 | 6/2013 |
| WO | 2013/172258 A1 | 11/2013 |

\* cited by examiner

CLUTCH CONTROL DEVICE FOR 4-WHEEL DRIVE VEHICLE

CROSS-REFERENCE TO RELATED APPLICATIONS

This application is a U.S. National stage application of International Application No. PCT/JP2015/055250, filed Feb. 24, 2015, which claims priority to JP Patent Application No. 2014-036446 filed on Feb. 27, 2014, the contents of which are hereby incorporated herein by reference.

BACKGROUND

Field of the Invention

The present invention generally relates to a clutch control device for a four-wheel drive vehicle in which a system for transmitting drive force to auxiliary drive wheels is provided with a dog clutch and a friction clutch.

Background Information

Conventionally, a front wheel drive based four-wheel drive vehicle in which a system for transmitting drive force to the rear wheels is provided with a dog clutch and a friction clutch is known (refer to, for example, Japanese Laid-Open Patent Application No. 2010-254058). In the four-wheel drive vehicle, when switching from a two-wheel drive mode to a four-wheel drive mode, the dog clutch is engaged after the friction clutch is engaged. In addition, when switching from a four-wheel drive mode to a two-wheel drive mode, the dog clutch is released after the friction clutch is released.

SUMMARY

However, in a conventional device, when switching from a two-wheel drive mode to a four-wheel drive mode, the input and output rotations of the dog clutch are synchronized by engaging the friction clutch at an unambiguously determined timing after an engagement request is output. For this reason, when a standby two-wheel drive mode, which engages only the dog clutch, is added as a drive mode, the timing from the engagement request to the start of engagement of the friction clutch when switching to a four-wheel drive mode and when switching to a standby two-wheel drive mode will be the same. Therefore, when the timing from the engagement request to the start of engagement of the friction clutch is delayed aiming at fuel efficiency performance, there is the problem that the responsiveness of switching to the four-wheel drive mode is impaired, and there is a concern of a negative impact on the four-wheel drive performance. On the other hand, when the timing from the engagement request to the start of engagement of the friction clutch is hastened, there is the problem that, although the responsiveness of switching to the four-wheel drive mode is secured, the travel region in the high fuel efficiency two-wheel drive mode is reduced.

In view of the problems described above, an object of the present invention is to provide a clutch control device for a four-wheel drive vehicle capable of achieving a balance between securing four-wheel drive performance and securing energy conservation performance when there is a request to engage the dog clutch.

In order to achieve the object above, in the present invention, of the left and right front wheels and the left and right rear wheels, one pair is set as main drive wheels which are connected to a drive source and the other pair is set as auxiliary drive wheels which are connected to the drive source via a clutch. Provided as the clutches are a dog clutch and a friction clutch, disposed in a transmission system path on the drive branch-side across the differential, and in a transmission system path on the auxiliary drive wheel-side, respectively, of a system for transmitting drive force to the auxiliary drive wheels. The dog clutch separates the system for transmitting drive force to the auxiliary drive wheels from the system for transmitting drive force to the main drive wheels by releasing the clutch, and the friction clutch allocates a portion of the drive force from the drive source to the auxiliary drive wheels in accordance with the clutch engagement capacity. In this four-wheel drive vehicle, a clutch control means is provided, which carries out a control of starting the engagement of the dog clutch, which is in a disengaged state, after putting the dog clutch in a rotationally synchronized state by engaging the friction clutch, when there is a request to engage the dog clutch. The four-wheel drive vehicle comprises a disconnected, two-wheel drive mode in which the dog clutch and the friction clutch are disengaged, a standby two-wheel drive mode in which the dog clutch is engaged and the friction clutch is disengaged, and a connected, four-wheel drive mode in which the dog clutch and the friction clutch are engaged. The clutch control means sets the engagement start timing of the friction clutch when a transition is made to the connected, four-wheel drive mode to an earlier timing compared to when a transition is made to the standby two-wheel drive mode, when there is a request to engage the dog clutch while in a state in which the disconnected, two-wheel drive mode is selected.

Therefore, when there is a request to engage the dog clutch while in a state in which the disconnected, two-wheel drive mode is selected, the engagement start timing of the friction clutch when a transition is made to the connected, four-wheel drive mode is set to an earlier timing compared to when a transition is made to the standby two-wheel drive mode. That is, the "disconnected, two-wheel drive mode" is a high energy conservation performance two-wheel drive mode that suppresses friction loss, and the like, by stopping the rotation of the system for transmitting drive force to the auxiliary drive wheels from the dog clutch to the friction clutch. The "connected, four-wheel drive mode" is a high drive performance four-wheel drive mode that allocates the drive force from the drive source to the four wheels at the time of an acceleration request, and the like. The "standby two-wheel drive mode" is a two-wheel drive mode having an improved responsiveness when a transition is made to a four-wheel drive state compared to the "disconnected, two-wheel drive mode." Additionally, when there is a request to engage the dog clutch, it is necessary to put the input and output rotations of the dog clutch in a synchronized state by engaging the friction clutch. In contrast, in view of the fact that a higher responsiveness is required for switching to a four-wheel drive state compared to a switching transition in which a two-wheel drive state is maintained, the engagement of the friction clutch is started at an earlier timing when switching from the "disconnected, two-wheel drive mode" to the "connected, four-wheel drive mode." Accordingly, the state becomes a rotationally synchronized state sooner after the engagement request, and responsiveness of switching to a four-wheel drive mode is secured. On the other hand, the engagement of the friction clutch is started at a later timing when switching from the "disconnected, two-wheel drive mode" to the "standby two-wheel drive mode." Accordingly, the state does not enter a rotationally synchronized state until a long time has passed after the engagement request, the travel region in the "disconnected, two-wheel drive mode" is substantially expanded, and energy conservation performance is secured. As a result, a balance between securing four-wheel drive performance and securing energy conservation performance can be achieved, when there is a request to engage the dog clutch.

DETAILED DESCRIPTION OF THE EMBODIMENTS

Figure 1:
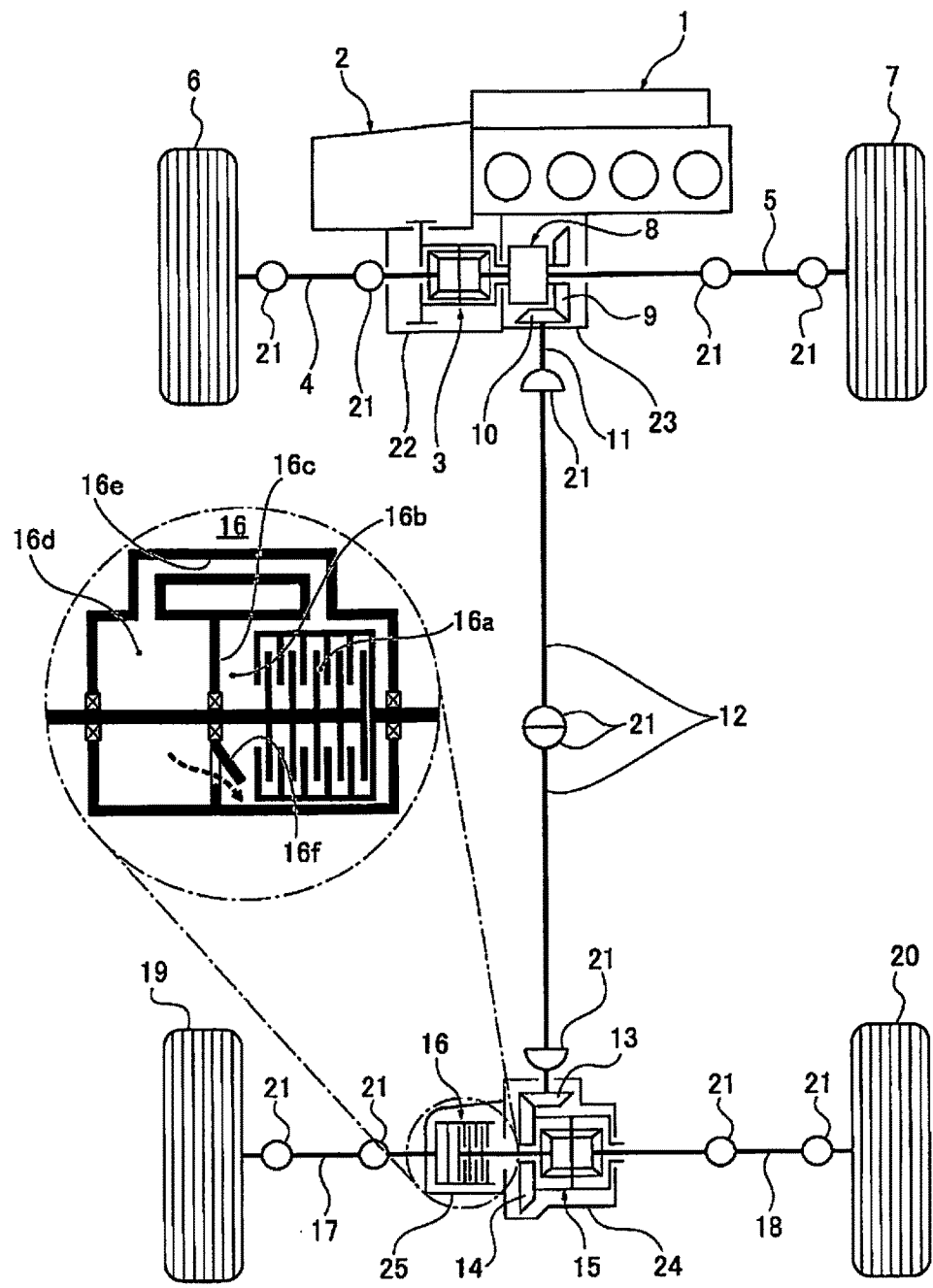
FIG. 1 is a block view of the drive system illustrating the configuration of the drive system of a front wheel drive based four-wheel drive vehicle to which is applied the clutch control device of the first embodiment.

Preferred embodiments for realizing the clutch control device for a four-wheel drive vehicle of the present invention will be described below based on the first embodiment and the second embodiment illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment. The overall configuration of the clutch control device for a drive system configuration of four-wheel drive vehicle will be described first.

Drive System Configuration of the Four-Wheel Drive Vehicle

FIG. 1 illustrates the configuration of the drive system of a front wheel drive based four-wheel drive vehicle to which is applied the clutch control device. The drive system configuration of the four-wheel drive vehicle will be described below based on FIG. 1.

The front wheel drive system of the four-wheel drive vehicle is provided with a transverse engine 1 (drive source), a transmission 2, a front differential 3, a left front wheel drive shaft 4, a right front wheel drive shaft 5, a left front wheel 6 (main drive wheel), and a right front wheel 7 (main drive wheel), as illustrated in FIG. 1. That is, the drive force is transmitted from the transverse engine 1 and the transmission 2 to the left and right front wheel drive shafts 4, 5 via the front differential 3, and constantly drives the left and right front wheels 6 and 7 while allowing a differential rotation.

The rear wheel drive system of the four-wheel drive vehicle comprises a dog clutch 8 (dog clutch), a bevel gear 9, an output pinion 10, a rear wheel output shaft 11, and a propeller shaft 12, as illustrated in FIG. 1. Further provided are a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). In FIG. 1, a universal joint 21 is provided. That is, the drive system is configured to be capable of selecting a two-wheel drive mode (i.e., disconnected, two-wheel drive mode) in which both the dog clutch 8 and the electronically controlled coupling 16 are disengaged. The rotation of the drive system (rotation of the propeller shaft 12, etc.) on the downstream side of the dog clutch 8 is stopped by releasing this dog clutch 8 and electronically controlled coupling 16; it is thereby possible to suppress friction loss and oil stirring loss to achieve improved fuel efficiency.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The input side meshing member of the dog clutch 8 is connected to the differential case of the front differential 3, and the output side meshing member of the dog clutch 8 is connected to the bevel gear 9. The dog clutch 8, the bevel gear 9, the output pinion 10, and a portion of the rear wheel output shaft 11 are incorporated in a transfer case 23 that is fixed to a position adjacent to the front differential housing 22. For example, a dog clutch in which one of a pair of meshing members is a fixing member and the other is a movable member, in which a spring that biases in the engaging direction is provided between the fixing member and the movable member, and in which a screw groove that can be fitted with a solenoid pin is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the dog clutch 8 is engaged and the fitting of the solenoid pin with respect to the screw groove is disengaged, the movable member makes a stroke in the engaging direction toward the fixing member due to the biasing force of the spring, and the teeth of the two are meshed and engaged.

The electronically controlled coupling 16 is a friction clutch that is provided in a downstream position of the dog clutch 8, and that allocates a portion of the drive force from the transverse engine 1 to the left and right rear wheels 19 and 20, in accordance with the clutch engagement capacity. An input side clutch plate of the electronically controlled coupling 16 is connected to a left side gear of the rear differential 15, and an output side clutch plate is connected to a left rear wheel drive shaft 17. This electronically controlled coupling 16 is incorporated in a coupling case 25 that is fixed in a position adjacent to the rear differential housing 24. For example, an electronically controlled coupling comprising a multi-plate friction clutch in which multiple input-side and output-side plates are alternately arranged, a fixed cam piston and a movable cam piston which have opposing cam surfaces, and a cam member that is interposed between the opposing cam surfaces, is used as this electronically controlled coupling 16. The engagement of the electronically controlled coupling 16 is carried out by the movable cam piston being stroked in the clutch engaging direction in accordance with the rotation angle to increase the frictional engagement force of the multi-plate friction clutch, due to a cam action that expands the piston gap that is generated by an electric motor rotating the movable cam piston. The release of the electronically controlled coupling 16 is carried out by the movable cam piston being moved in the clutch releasing direction in accordance with the rotation angle to decrease the frictional engagement force of the multi-plate friction clutch, due to a cam action that reduces the piston gap that is generated by the electric motor rotating the movable cam piston in the opposite direction of the engaging direction.

The electronically controlled coupling 16 comprises a multi-plate friction clutch 16a, a clutch chamber 16b, a partition wall 16c, an oil chamber 16d, an oil passage 16e, and an open/close valve 16f, as illustrated in the enlarged view of the coupling in FIG. 1. The clutch chamber 16b houses the multi-plate friction clutch 16a. The oil chamber 16d is a separate chamber partitioned from the clutch chamber 16b by the partition wall 16c. The oil passage 16e places the clutch chamber 16b and the oil chamber 16d in communication, and conveys oil from the clutch chamber 16b to the oil chamber 16d by centrifugal force. The open/close valve 16f is provided on the partition wall 16c, and is configured to open/close the valve in conjunction with the stroke movement of the movable cam piston, so that the valve closes at the full release position and opens at a position other than the full release position of the movable cam piston. That is, when the electronically controlled coupling 16 is disengaged and the open/close valve 16f is closed, the oil in the clutch chamber 16b flows into the oil chamber 16d by centrifugal force and fills the oil chamber 16d with oil. When the open/close valve 16f is opened, the oil in the oil chamber 16d flows into the clutch chamber 16b. In this manner, when the electronically controlled coupling 16 is disengaged (for example, when the "standby two-wheel drive mode" is selected), the oil stirring resistance is suppressed.

Control System Configuration of the Four-Wheel Drive Vehicle

Figure 2:
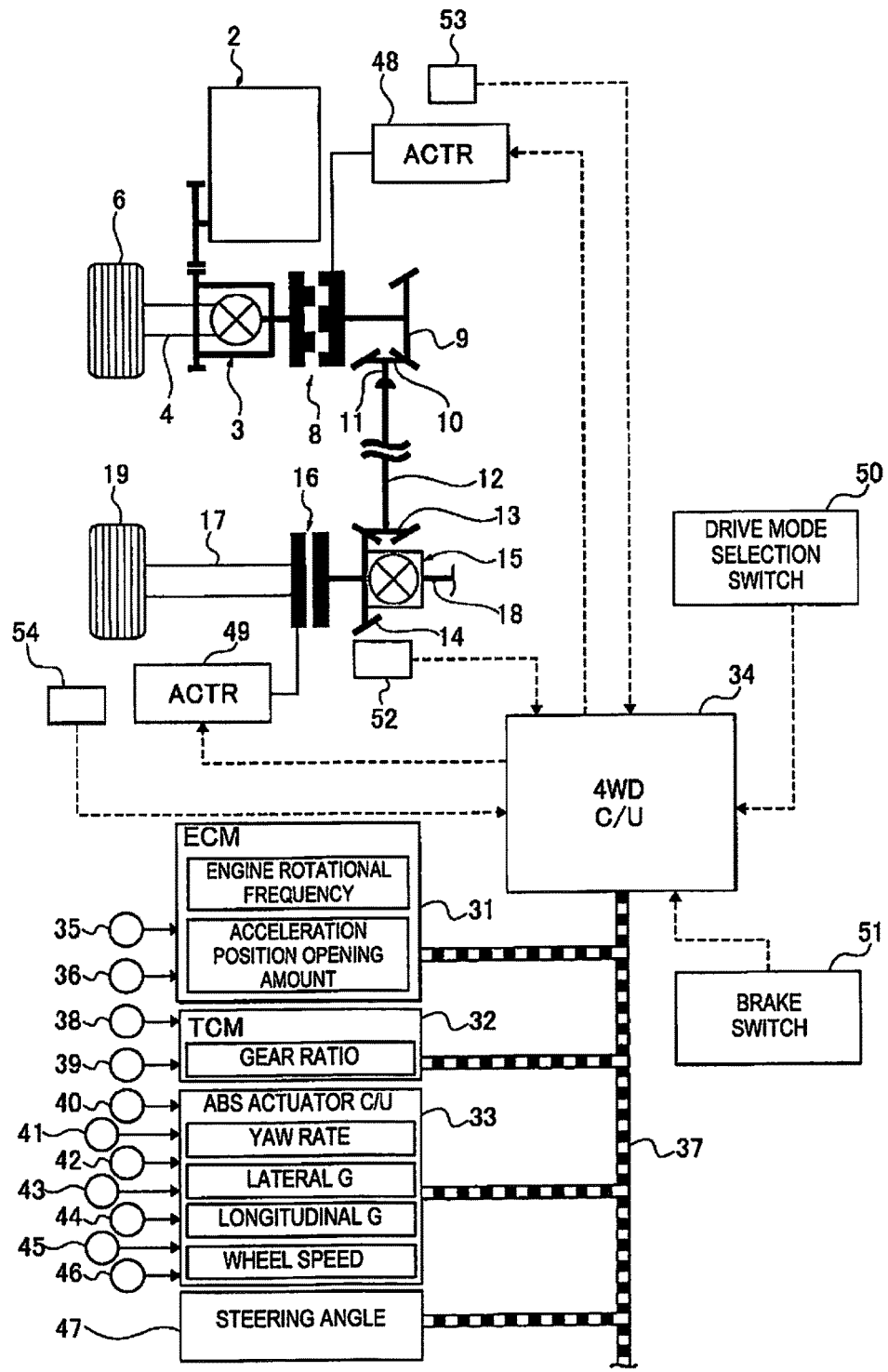
FIG. 2 is a block view of the control system illustrating the configuration of the control system of the front wheel drive based four-wheel drive vehicle to which is applied the clutch control device of the first embodiment.

FIG. 2 illustrates the configuration of the control system of the front wheel drive based four-wheel drive vehicle to which is applied the clutch control device. The control system configuration of the four-wheel drive vehicle will be described below based on FIG. 2.

The control system of the four-wheel drive vehicle is provided with an engine control module 31, a transmission control module 32, an ABS actuator control unit 33, and a 4WD control unit 34, as illustrated in FIG. 2.

The engine control module 31 is a control device of the transverse engine 1, which inputs detection signals from an engine rotational frequency sensor 35, an accelerator position opening amount sensor 36, and the like. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like. Gear ratio information (gear ratio information) is input from this transmission control module 32 to the 4WD control unit 34 via the CAN communication line 37.

The ABS actuator control unit 33 is a control device of an ABS actuator which controls the brake fluid pressure of each wheel, which inputs detection signals from a yaw rate sensor 40, a lateral G sensor 41, a longitudinal G sensor 42, and wheel speed sensors 43, 44, 45, 46, and the like. Yaw rate information, lateral G information, longitudinal G information, and wheel speed information of each wheel, are input from this ABS actuator control unit 33 to the 4WD control unit 34 via the CAN communication line 37. Besides the information described above, steering angle information from a steering angle sensor 47 is input to the 4WD control unit 34 via the CAN communication line 37. The average value of the left and right rear wheel speed information will be the vehicle speed information (VSP information).

The 4WD control unit 34 is a control device that controls the engagement and disengagement of the dog clutch 8 and the electronically controlled coupling 16, and carries out a calculation step based on various input information. The control unit outputs drive control commands to a dog clutch actuator 48 (solenoid) and an electronically controlled coupling actuator 49 (electric motor). Here, a drive mode selection switch 50, a brake switch 51 that detects the presence/absence of a braking operation, a ring gear rotational frequency sensor 52, a dog clutch stroke sensor 53, a motor rotation angle sensor 54, and the like are provided as input information sources from other than the CAN communication line 37.

The drive mode selection switch 50 is a switch with which a driver switches to select among a "2WD mode," a "lock mode," and an "auto mode." When the "2WD mode" is selected, a front wheel drive 2WD state in which the dog clutch 8 and the electronically controlled coupling 16 are released is maintained. When the "lock mode" is selected, a full 4WD state in which the dog clutch 8 and the electronically controlled coupling 16 are engaged is maintained. Furthermore, when the "auto mode" is selected, the engagement and disengagement of the dog clutch 8 and the electronically controlled coupling 16 are automatically controlled in accordance with the vehicle state (vehicle speed VSP, accelerator position opening amount ACC). Here, in "auto mode," there is a choice between an "eco-auto mode" and a "sports auto mode," where the release state of the electronically controlled coupling 16 in "standby two-wheel drive mode," in which the dog clutch 8 is engaged, will differ and depends upon the selected mode. That is, when "eco-auto mode" is selected, the electronically controlled coupling 16 is placed in a fully released state and waits, and when "sports auto mode" is selected, the electronically controlled coupling 16 is placed in a released state immediately before engagement and waits.

The ring gear rotational frequency sensor 52 is a sensor for acquiring output rotational speed information of the dog clutch 8, and which calculates the output side rotational frequency of the dog clutch 8 by taking into consideration the rear side gear ratio and the front side gear ratio upon calculation with respect to the detected value of the ring gear rotational frequency. The input rotational speed information of the dog clutch 8 is obtained by calculating the average value of the left front wheel speed from the left front wheel speed sensor 43 and the right front wheel speed from the right front wheel speed sensor 44.

Drive Mode Switching Configuration

Figure 3:
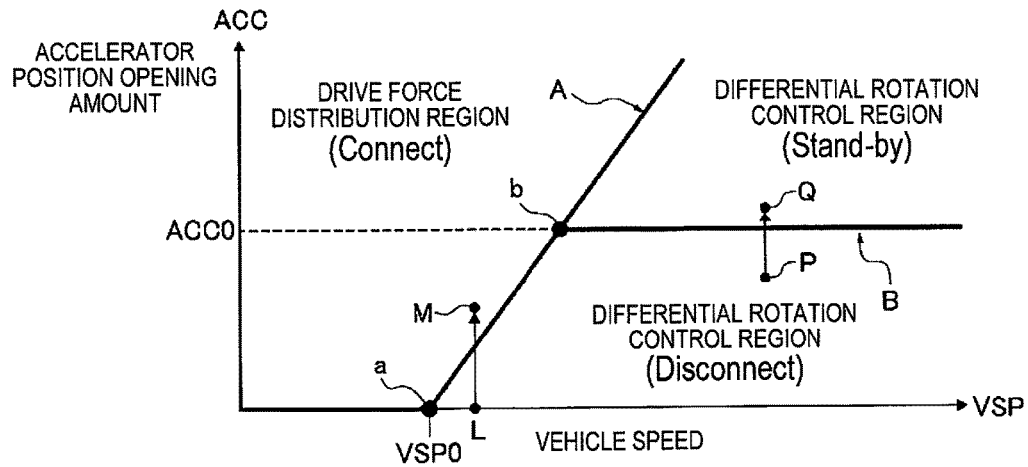
FIG. 3 is a basic map view illustrating a drive mode switching map corresponding to the vehicle speed and the accelerator position opening amount used in the clutch control, when the "auto mode" of the first embodiment is selected.
Figure 4:
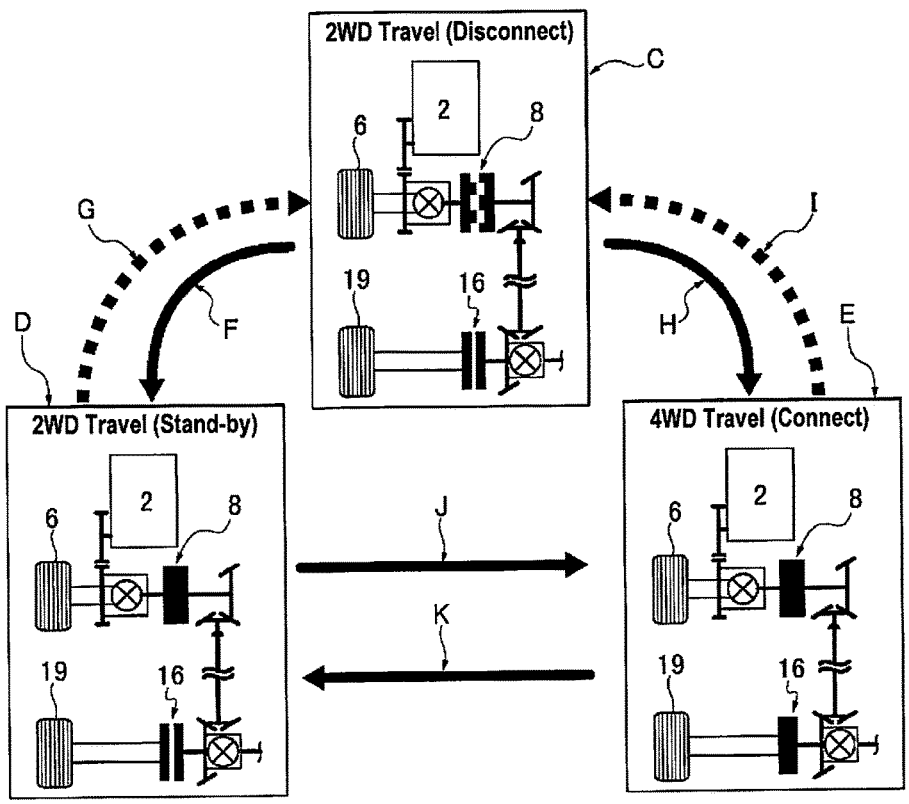
FIG. 4 is a drive mode transition view illustrating the switching transition of the drive mode (disconnected, two-wheel drive mode/standby two-wheel drive mode/connected, four-wheel drive mode) by the clutch control, when the "auto mode" of the first embodiment is selected.

FIG. 3 illustrates a drive mode switching map corresponding to the vehicle speed VSP and the accelerator position opening amount ACC used in the clutch control when the "auto mode" is selected, and FIG. 4 illustrates the switching transition of the drive mode (disconnected, two-wheel drive mode/standby two-wheel drive mode/connected, four-wheel drive mode). The drive mode switching configuration will be described below, based on FIGS. 3 and 4.

The drive mode switching map is set to be separated into the disconnected, two-wheel drive mode (Disconnect), the standby two-wheel drive mode (Standby), and the connected, four-wheel drive mode (Connect), in accordance with the vehicle speed VSP and the accelerator position opening amount ACC, as illustrated in FIG. 3. These three drive modes are separated by a region dividing line A in which the accelerator position opening amount ACC is increased proportionally with the increase in the vehicle speed VSP from a base point a of a set vehicle speed VSP0 at which the accelerator position opening amount is zero, and a region dividing line B of a constant accelerator position opening amount ACC0, which is drawn from an intersection b with the region dividing line A toward the high vehicle speed side.

The disconnected, two-wheel drive mode (Disconnect) is set in the region in which the accelerator position opening amount ACC is less than or equal to the set accelerator position opening amount ACC0, and which is surrounded by the vehicle speed axis line on which the accelerator position opening amount ACC is zero, the region dividing line A, and the region dividing line B. That is, the mode is set in a region in which the frequency of occurrence of the differential rotation of the left and right front wheels 6 and 7 and the left and right rear wheels 19 and 20 due to wheel slip is extremely low, since the accelerator position opening amount ACC is less than or equal to the set accelerator position opening amount ACC0; and even if wheel slip does occur, the four-wheel drive requirement is low, so that slip increases slowly.

The standby two-wheel drive mode (Standby) is set in a high vehicle speed region in which the accelerator position opening amount ACC exceeds the set accelerator position opening amount ACC0, and which is defined by the region dividing line A and the region dividing line B. That is, the mode is set in a region in which, since the accelerator position opening amount ACC exceeds the set accelerator position opening amount ACC0, while the 4WD requirement is low because the vehicle speed VSP is in a high vehicle speed region, if differential rotation of the left and right front wheels 6 and 7 and the left and right rear wheels 19 and 20 is generated due to wheel slip, there is a high probability that the slip will increase rapidly.

The connected, four-wheel drive mode (Connect) is set in the region surrounded by the accelerator position opening amount axis line on which the vehicle speed VSP is zero, the vehicle speed axis line on which the accelerator position opening amount ACC is zero, and the region dividing line A. That is, the mode is set in a region in which the 4WD requirement is high, such as when starting or upon high-load travel in which the vehicle speed VSP is low but the accelerator position opening amount ACC is high.

When the disconnected, two-wheel drive mode (Disconnect) is selected, the travel mode becomes 2WD travel (Disconnect) in which both the dog clutch 8 and the electronically controlled coupling 16 are released, as illustrated in frame C of FIG. 4. Basically, in this disconnected, two-wheel drive mode, front wheel drive 2WD travel (Disconnect), in which drive force is transmitted only to the left and right front wheels 6 and 7, is maintained. However, if the left and right front wheels 6 and 7 slip during front wheel drive 2WD travel and the wheel slip amount (i.e., amount of differential rotation between the front and rear wheels) exceeds a threshold value, the electronically controlled coupling 16 is frictionally engaged. Thereafter, if a rotationally synchronized state is determined, differential rotation control of the front and rear wheels to suppress wheel slip is carried out by engaging the dog clutch 8 and allocating drive force to the left and right drive wheels 19 and 20.

When the standby two-wheel drive mode (Standby) is selected, the travel mode becomes 2WD travel (Standby) in which the dog clutch 8 is engaged and the electronically controlled coupling 16 is released, as illustrated in frame D of FIG. 4. Basically, in this standby two-wheel drive mode, front wheel drive 2WD travel (Standby), in which drive force is transmitted only to the left and right front wheels 6 and 7, is maintained. However, if the left and right front wheels 6 and 7 slip during front wheel drive 2WD travel and the wheel slip amount (i.e., amount of differential rotation between the front and rear wheels) exceeds a threshold value, only the electronically controlled coupling 16 is frictionally engaged, since the dog clutch 8 has already been engaged. Differential rotation control of the front and rear wheels to suppress wheel slip is carried out by allocating drive force to the left and right rear wheels 19 and 20 with good responsiveness by this frictional engagement of the electronically controlled coupling 16.

When the connected, four-wheel drive mode (Connect) is selected, the travel mode becomes 4WD travel (Connect) in which both the dog clutch 8 and the electronically controlled coupling 16 are engaged, as illustrated in frame E of FIG. 4. Basically, in this connected, four-wheel drive mode (Connect), a drive force distribution control is carried out, which achieves the optimum drive force distribution to the left and right front wheels 6 and 7, and to the left and right rear wheels 19 and 20 that is suited to the road conditions (for example, control at the time of start, control corresponding to the accelerator position opening amount, and control corresponding to the vehicle speed). However, if a turning state of the vehicle is determined during 4WD travel from information from the steering angle sensor 47, the yaw rate sensor 40, the lateral G sensor 41, or the longitudinal G sensor 42, a control is carried out in which the engagement capacity of the electronically controlled coupling 16 is decreased to reduce the possibility of a tight corner braking phenomenon.

The switching transition between the 2WD travel (Disconnect), 2WD travel (Standby), and 4WD travel (Connect) is carried out by a switching request of the drive mode that is output when an operating point, which is determined by the vehicle speed VSP and the accelerator position opening amount ACC, crosses the region dividing line A and the region dividing line B illustrated in FIG. 3. The switching transition speed of each drive mode is determined so that the transition speed to a drive mode that meets a 4WD request is prioritized over the transition speed to the disconnected, two-wheel drive mode that meets a fuel efficiency request. That is, the switching transition speed of 2WD travel (Disconnect)→2WD travel (Standby) (arrow F in FIG. 4) is configured to be fast, and the switching transition speed of 2WD travel (Standby)→2WD travel (Disconnect) (arrow G in FIG. 4) is configured to be slow. Similarly, the switching transition speed of 2WD travel (Disconnect)→4WD travel (Connect) (arrow H in FIG. 4) is configured to be fast and the switching transition speed of 4WD travel (Connect)→2WD travel (Disconnect) (arrow I in FIG. 4) is configured to be slow. In contrast, the switching transition speed of 2WD travel (Standby)→4WD travel (Connect) (arrow J in FIG. 4) is configured to be the same fast speed as the switching transition speed of 4WD travel (Connect)→2WD travel (Standby) (arrow K in FIG. 4).

Clutch Control Configuration

Figure 5:
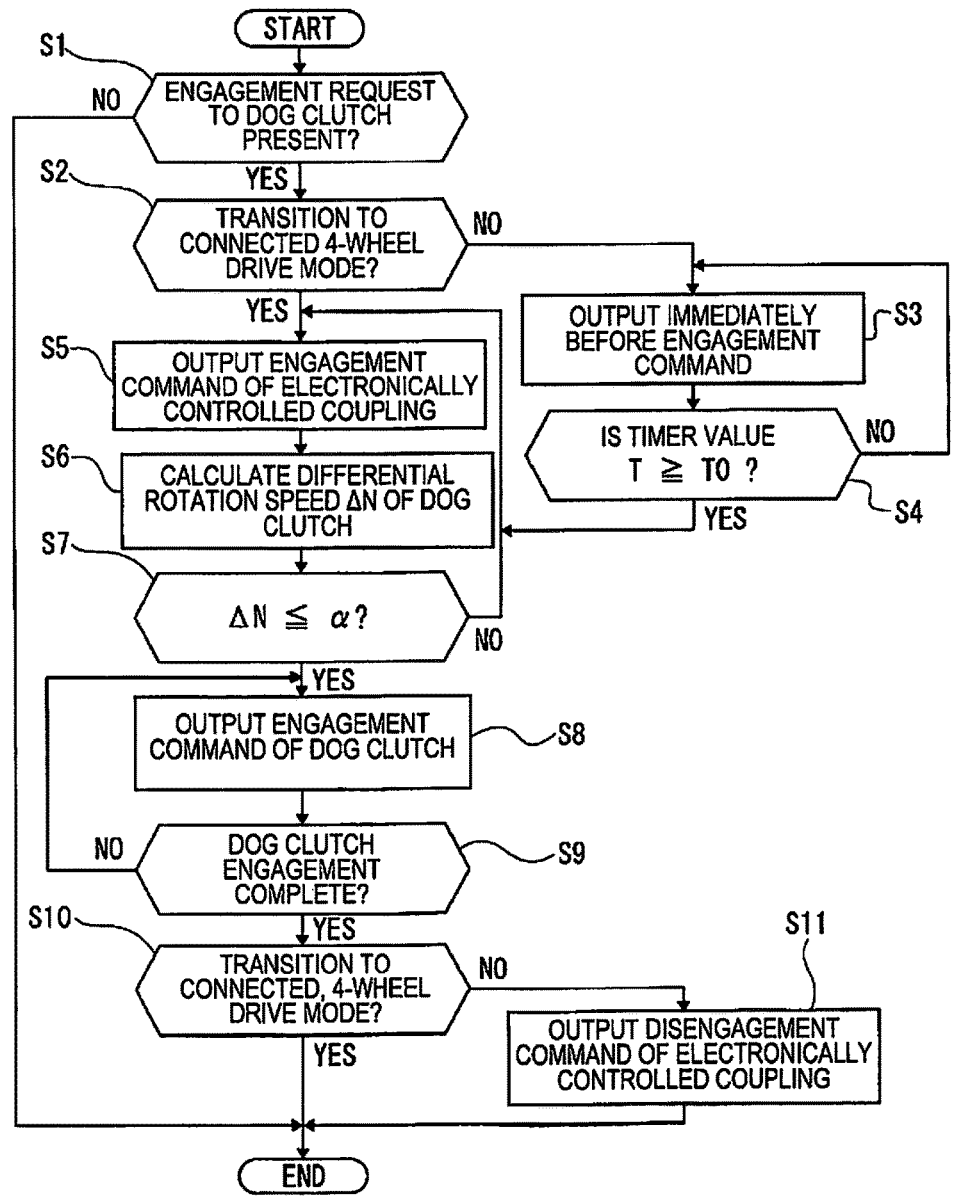
FIG. 5 is a flowchart illustrating the flow of the oil temperature control process that is executed in the 4WD control unit of the first embodiment.

FIG. 5 illustrates the flow of the clutch control process that is executed in the 4WD control unit 34 (clutch controller). Each of the steps in FIG. 5 will be described below, which represents the clutch control process configuration. This flowchart is started when the "auto mode" is selected as well as the "disconnected, two-wheel drive mode," in which both the dog clutch 8 and the electronically controlled coupling 16 are disengaged, is selected as the drive mode.

In Step S1, whether or not there is a request to engage the dog clutch 8 is determined. If YES (engagement request present), the process proceeds to Step S2, and if NO (engagement request absent), the process proceeds to END. Here, a request to engage the dog clutch 8 is output when the "disconnected, two-wheel drive mode" is selected and it is determined that there is a mode transition to the "connected, four-wheel drive mode" or the "standby two-wheel drive mode."

In Step S2, following the determination that there is an engagement request in Step S1, it is determined whether or not it is a transition to the connected, four-wheel drive mode. If YES (transition to the connected, four-wheel drive mode), the process proceeds to Step S4, and if NO (transition to standby two-wheel drive mode), the process proceeds to Step S3.

In Step S3, following the determination that it is a transition to the "standby two-wheel drive mode" in Step S2, an immediately before engagement command is output to the coupling actuator 49 of the electronically controlled coupling 16, and the process proceeds to Step S4. Here, the immediately before engagement command of the electronically controlled coupling 16 is a command to maintain the released state immediately before engagement of the electronically controlled coupling 16, and a command to open the closed open/close valve 16f.

In Step S4, following the output of the immediately before engagement command of the electronically controlled coupling 16 in Step S3, it is determined whether or not the value T of the timer, which is initiated starting from the time that a request to engage the dog clutch 8 is output, is greater than or equal to a set value T0. In the case of YES (T≥T0), the process proceeds to Step S4, and in the case of NO (T<T0), the determination of Step S3 is repeated. Here, the set value T0 is set to the time that is required for most of the lubrication oil, which is transferred to the oil chamber 16d, to flow into the clutch chamber 16b via the open open/close valve 16 when the open/close valve 16 is opened by putting the electronically controlled coupling 16, which is in a disengaged state, in an immediately before engagement state.

In step S5, following the determination that it is a transition to the "connected, four-wheel drive mode" in step S2, or, the determination that T≥0 in step 4, or, the determination that ΔN>α in step S7, an engagement command is output to the coupling actuator 49 of the electronically controlled coupling 16, and the process proceeds to Step S6. Here, the engagement command to the coupling actuator 49 will be a high-gradient command with which the electronically controlled coupling 16 is put in a fully engaged state in a short period of time if transitioning to the "connected, four-wheel drive mode," and a low-gradient command with which the electronically controlled coupling 16 is gradually transitioned from a disengaged state to a fully engaged state if transitioning to the "standby two-wheel drive mode."

In Step S6, following the output of the engagement command of the electronically controlled coupling 16 in Step S5, the clutch differential rotation speed ΔN, which is the differential rotation of the dog clutch 8, is calculated, and the process proceeds to Step S7. Here, the clutch differential rotation speed ΔN is calculated by subtracting the output rotational speed (calculated value based on the detection value of the ring gear rotational frequency) from the input rotational speed (average value of the left and right front wheel speeds) of the dog clutch 8.

In Step S7, following the calculation of the clutch differential rotation speed ΔN in Step S6, it is determined whether or not the clutch differential rotation speed ΔN is less than or equal to the rotation synchronization determination threshold value α. If YES (ΔN≤α), the process proceeds to Step S8, and if NO (ΔN>α), the process returns to Step S6. Here, the rotation synchronization determination threshold value α is a clutch differential rotation speed value for determining a rotationally synchronized state in which the engagement of the dog clutch 8 is possible, and a fixed value may be given, or a variable value corresponding to the vehicle speed VSP, or the like, may be given.

In Step S8, following the determination that ΔN≤α in Step S7, or, the determination that clutch engagement is incomplete in Step S9, an engagement command is output to the clutch actuator 48 of the dog clutch 8, and the process proceeds to Step S9.

In Step S9, following the output of an engagement command to the dog clutch 8 in Step S8, it is determined whether or not the engagement of the dog clutch 8 is complete. If YES (clutch engagement complete), the process proceeds to Step S10, and if NO (clutch engagement incomplete), the process returns to Step S8. Here, the determination of whether or not the engagement of the dog clutch 8 is complete is carried out on the basis of stroke information from the dog clutch stroke sensor 53.

In Step S10, following the determination that clutch engagement is complete in Step S9, it is determined whether or not it is a transition to the connected, four-wheel drive mode. If YES (transition to the connected, four-wheel drive mode), the process proceeds to END, and if NO (transition to standby two-wheel drive mode), the process proceeds to Step S11.

In Step S11, following the determination that it is a transition to the standby two-wheel drive mode in Step S10, a disengagement command is output to the coupling actuator 49 of the electronically controlled coupling 16, and the step proceed to END. Here, of the "auto mode," if the "eco-auto mode" is selected, the command will be a command to fully disengage the electronically controlled coupling 16, and if the "sports auto mode" is selected, the command will be a command to maintain the released state immediately before engagement of the electronically controlled coupling 16.

Next, the actions are described. The "engagement control action of the dog clutch," the "synchronization start timing determination action of the dog clutch," and the "other characteristic action in the dog clutch engagement control" will be separately described, regarding the actions in the clutch control device for a four-wheel drive vehicle of the first embodiment.

Engagement Control Action of the Dog Clutch

First, the flow of the engagement control process of the dog clutch 8 will be described with reference to the flowchart of FIG. 5. For example, during coasting travel when the foot is lifted off the accelerator in a low vehicle speed region in which the "disconnected, two-wheel drive mode" is selected and the operating point is moved from point L to point M in FIG. 3 by carrying out an accelerator depression operation, an engagement request is output to the dog clutch 8 at a timing when the operating point crosses the region dividing line A. Alternatively, during driving travel in a high vehicle speed region in which the "disconnected, two-wheel drive mode" is selected and the operating point is moved from point P to point Q in FIG. 3 by carrying out an accelerator additional depression operation, an engagement request is output to the dog clutch 8 at a timing when the operating point crosses the region dividing line B.

First, when transitioning from the "disconnected, two-wheel drive mode" to the "connected, four-wheel drive mode" and an engagement request is output to the dog clutch 8, the process proceeds to Step S1→Step S2→Step S5→Step S6→Step S7 in the flowchart of FIG. 5. In Step S5, if there is a request to engage the dog clutch 8, an engagement command is immediately output to the coupling actuator 49 of the electronically controlled coupling 16. In Step S6, the clutch differential rotation speed ΔN, which is the differential rotation of the dog clutch 8, is calculated, and in Step S7, it is determined whether or not the clutch differential rotation speed ΔN is less than or equal to the rotation synchronization determination threshold value α. Then, while it is determined that ΔN>α in Step S7, the flow that proceeds to Step S5→S6→S7 is repeated.

Then, when the rotation synchronization determination condition is satisfied in Step S7, the process proceeds from Step S7 to S8→Step S9 in the flowchart of FIG. 5, and in Step S8, an engagement command is output to the clutch actuator 48 of the dog clutch 8. In the next Step S9, it is determined whether or not the engagement of the dog clutch 8 is complete, and while it is determined that the clutch engagement is incomplete, the flow that proceeds to Step S8→Step S9 is repeated. When it is determined that the engagement of the dog clutch 8 is complete in Step S9, the process proceeds from Step S9 to Step S10→END.

Next, the engagement control action of the dog clutch 8 when transitioning from the "disconnected, two-wheel drive mode" to the "connected, four-wheel drive mode" will be explained based on the time chart of FIG. 6. When the accelerator position opening amount ACC rises and a request to engage the dog clutch 8 is output at time t1, by the engagement of the electronically controlled coupling 16 starting at the timing of time t1, the coupling transmission torque starts to rise, and the stopped propeller shaft 12 starts to rotate. Accordingly, the clutch differential rotation speed ΔN starts to fall.

From time t1 to time t2, the engine torque rises in accordance with the accelerator position opening amount ACC, and the coupling transmission torque rises to a torque by full engagement. Then, the output rotation of the dog clutch 8 rises and the clutch differential rotation speed ΔN falls toward zero differential rotation, in accordance with the increasing of coupling transmission torque of the electronically controlled coupling 16.

When the rotation synchronization condition is met at time t2, the disengaged dog clutch 8 starts to engage. Regarding the oil amount of the clutch chamber, the open/close valve 16 opens at time t1 when the electronically controlled coupling 16, which is in a disengaged state, starts to engage, and the lubrication oil, which is transferred to the oil chamber 16d, starts to flow into the clutch chamber 16b. At time t2, only some of the lubrication oil has flowed in, and the engagement of the dog clutch 8 is started in this state. In other words, all of the lubrication oil, which is transferred to the oil chamber 16d, does not flow into the clutch chamber 16b until time t3.

In this manner, when an accelerator depression operation is performed while the "disconnected, two-wheel drive mode" is selected, the dog clutch 8 is engaged in only a short time Δt1, from time t1 when the engagement of the dog clutch 8 is requested to time t2 when the rotation synchronization determination condition is met. As a result, a drive mode transition from the "disconnected, two-wheel drive mode" to the "connected, four-wheel drive mode" is achieved with good responsiveness.

Next, when transitioning from the "disconnected, two-wheel drive mode" to the "standby two-wheel drive mode" and an engagement request is output to the dog clutch 8, the process proceeds to Step S1→Step S2→Step S3→Step S4 in the flowchart of FIG. 5. In Step S3, an immediately before engagement command is output to the coupling actuator 49 of the electronically controlled coupling 16, and in Step S4, it is determined whether or not the value T of the timer, which is initiated starting from the time that a request to engage the dog clutch 8 is output, is greater than or equal to a set value T0. While T<T0, the flow that proceeds to Step S3→Step S4 is repeated, and the start of engagement of the electronically controlled coupling 16 is postponed. When T≥T0, the process proceeds from Step S4 to Step S5→Step S6→Step S7. In Step S5, an engagement command is output to the coupling actuator 49 of the electronically controlled coupling 16. In Step S6, the clutch differential rotation speed ΔN, which is the differential rotation of the dog clutch 8, is calculated, and in Step S7, it is determined whether or not the clutch differential rotation speed ΔN is less than or equal to the rotation synchronization determination threshold value α. Then, while it is determined that ΔN>α in Step S7, the flow that proceeds to Step S5→S6→S7 is repeated.

Then, when the rotation synchronization determination condition is satisfied in Step S7, the process proceeds from Step S7 to S8→Step S9 in the flowchart of FIG. 5, and in Step S8, an engagement command is output to the clutch actuator 48 of the dog clutch 8. In the next Step S9, it is determined whether or not the engagement of the dog clutch 8 is complete, and while it is determined that the clutch engagement is incomplete, the flow that proceeds to Step S8→Step S9 is repeated.

Then, when it is determined that the engagement of the dog clutch 8 is complete in Step S9, the process proceeds from Step S9 to Step S10→Step S11→END. In Step S11, a disengagement command is output to the coupling actuator 49 of the electronically controlled coupling 16. If the "eco-auto mode" is selected, the command will be a command to fully disengage the electronically controlled coupling 16, and if the "sports auto mode" is selected, the command will be a command to maintain the released state immediately before engagement of the electronically controlled coupling 16.

Next, the engagement control action of the dog clutch 8 when transitioning from the "disconnected, two-wheel drive mode" to the "standby two-wheel drive mode" will be explained based on the time chart of FIG. 7. When the accelerator position opening amount ACC is increased by additional depression and a request to engage the dog clutch 8 is output at time t1, at the timing of time t1, the open/close valve 16f is opened while the electronically controlled coupling 16 remains disengaged. Accordingly, at time t1, the lubrication oil, which is transferred to the oil chamber 16d, starts to flow into the clutch chamber 16b. At time t2, a state in which the open/close valve 16f is opened while the electronically controlled coupling 16 remains disengaged is maintained, and at time t3, all of the oil, which is transferred to the oil chamber 16d, flows into the clutch chamber 16b. The time from time t1 to time t2 corresponds to the set value T0 of the timer value T.

When a request to engage the electronically controlled coupling 16 is output at the timing of time t3, the coupling transmission torque starts to rise, and the stopped propeller shaft 12 starts to rotate, due to the engagement of the electronically controlled coupling 16. Accordingly, the clutch differential rotation speed ΔN starts to fall, and the clutch differential rotation speed ΔN falls toward zero differential rotation. When the rotation synchronization condition is met at time t4, the disengaged dog clutch 8 starts to engage. Regarding the oil amount of the clutch chamber, at time t3, since all of the lubrication oil that is transferred to the oil chamber 16d flows into the clutch chamber 16b, while the coupling transmission torque rises, the electronically controlled coupling 16 is immersed in lubrication oil.

In this manner, when an accelerator additional depression operation is performed while the "disconnected, two-wheel drive mode" is selected, the dog clutch 8 is engaged after a long time Δt2, from time t1 when the engagement of the dog clutch 8 is requested to time t4 when the rotation synchronization determination condition is met. As a result, a drive mode transition from the "disconnected, two-wheel drive mode" to the "standby two-wheel drive mode" is delayed, and the travel region in the fuel efficient "disconnected, two-wheel drive mode" is expanded.

Synchronization Start Timing Control Action of the Dog Clutch

Unlike a friction clutch that can be engaged regardless of the presence/absence of clutch differential rotation, the dog clutch 8 is a dog clutch that is engaged by putting the input and output rotations of the clutch into a synchronized state. Accordingly, when the "disconnected, two-wheel drive mode," in which the dog clutch 8 is released, is selected, and there is a request to engage the dog clutch 8, it is necessary to put the input and output rotations of the dog clutch 8 in a rotationally synchronized state by engaging the electronically controlled coupling 16.

On the other hand, the drive modes will be the "standby two-wheel drive mode" in which only the dog clutch 8 is engaged, in addition to the "disconnected, two-wheel drive mode" and the "connected, four-wheel drive mode." In this case, a request to engage the dog clutch 8 is output when switching from the "disconnected, two-wheel drive mode" to the "connected, four-wheel drive mode," and when switching from the "disconnected, two-wheel drive mode" to the "standby two-wheel drive mode." If the timing from the request to engage the dog clutch 8 to the start of engagement of the electronically controlled coupling 16 is always set to the same timing in either switching of the drive modes, there are the following problems.

(a) If the timing from the engagement request of the dog clutch 8 to the start of engagement of the electronically controlled coupling 16 is delayed for the sake of fuel efficiency performance, the responsiveness of switching to the "connected, four-wheel drive mode" will be impaired, and there is a concern of a negative impact on the four-wheel drive performance.

(b) On the other hand, if the timing from the engagement request of the dog clutch 8 to the start of engagement of the electronically controlled coupling 16 is hastened for the sake of responsiveness of switching to the "connected, four-wheel drive mode," the travel region in the high fuel efficiency "disconnected, two-wheel drive mode" will be reduced.

In contrast, in the first embodiment, when there is a request to engage the dog clutch 8 in a state in which the "disconnected, two-wheel drive mode" is selected, the synchronization timings are varied in accordance with the destination drive mode. The configuration is such that the engagement start timing of the electronically controlled coupling 16 when a transition is made to the "connected, four-wheel drive mode" is set to an earlier timing compared to when there is a transition to the "standby two-wheel drive mode."

That is, the "disconnected, two-wheel drive mode" is a high energy conservation performance two-wheel drive mode that suppresses friction loss and the like by stopping the rotation of the system for transmitting drive force to the left and right rear wheels 19 and 20 from the dog clutch 8 to the electronically controlled coupling 16. The "connected, four-wheel drive mode" is a high drive performance four-wheel drive mode that allocates the drive force from the transverse engine 1 to the four wheels at the time of an acceleration request and the like. The "standby two-wheel drive mode" is a two-wheel drive mode having an improved responsiveness when a transition is made to a four-wheel drive state compared to the "disconnected, two-wheel drive mode," by engaging the dog clutch 8 in advance. Additionally, when there is a request to engage the dog clutch 8, it is necessary to increase the output rotation of the dog clutch 8 and place the input and output rotations in a synchronized state by engaging the electronically controlled coupling 16.

The inventors paid particular attention to the fact that, in contrast, when switching from the "disconnected, two-wheel drive mode" to the "connected, four-wheel drive mode," that is, when switching from a two-wheel drive state to a four-wheel drive state, more responsiveness is required than a switching transition in which a two-wheel drive state is maintained. Accordingly, when switching from the "disconnected, two-wheel drive mode" to the "connected, four-wheel drive mode," the engagement of the electronically controlled coupling 16 is started at the early timing (time t1 in FIG. 6) when a request to engage the dog clutch 8 is output. Thus, the state becomes a rotationally synchronized state after a short time (time t1-t2 in FIG. 6) from the engagement request, and responsiveness of switching to the "connected, four-wheel drive mode" is secured.

On the other hand, the engagement of the electronically controlled coupling 16 is started at a later timing (time t3 of FIG. 7) when the clutch chamber 16b is filled with the lubrication oil, when switching from the "disconnected, two-wheel drive mode" to the "standby two-wheel drive mode." Accordingly, the state does not become a rotationally synchronized state until after a long time (time t1-t3 of FIG. 7), the travel region in the "disconnected, two-wheel drive mode" is substantially expanded, and energy conservation performance (fuel efficiency) is secured. As a result, a balance between securing four-wheel drive performance and securing energy conservation performance can be achieved, when there is a request to engage the dog clutch 8.

Other Featured Actions in the Dog Clutch Engagement Control

In the first embodiment, the configuration is such that the "disconnected, two-wheel drive mode" is set in a low accelerator position opening amount and high vehicle speed region, the "standby two-wheel drive mode" is set in a high accelerator position opening amount and high vehicle speed region, and the "connected, four-wheel drive mode" is set in all accelerator position opening amount and low vehicle speed regions. That is, the switching from the "disconnected, two-wheel drive mode" to the "connected, four-wheel drive mode" is carried out in a low vehicle speed and low accelerator position opening amount region (refer to FIG. 3). In this low vehicle speed and low accelerator position opening amount region, the load on the electronically controlled coupling 16 is small, and the rotation synchronization can be started without waiting for the lubrication oil to completely flow into the clutch chamber 16b side. On the other hand, the switching from the "disconnected, two-wheel drive mode" to the "standby two-wheel drive mode" is carried out in a high vehicle speed and high accelerator position opening amount region (refer to FIG. 3). In this high vehicle speed and high accelerator position opening amount region, the load on the electronically controlled coupling 16 is large. Therefore, when switching from the "disconnected, two-wheel drive mode" to the "connected, four-wheel drive mode," since the load on the electronically controlled coupling 16 is low, the rotation synchronization of the dog clutch 8 can be completed more quickly.

An electronically controlled coupling 16 of the first embodiment comprises a clutch chamber 16b, an oil chamber 16d partitioned from the clutch chamber 16b by a partition wall 16c, an oil passage 16e that brings the clutch chamber 16b and the oil chamber 16d into communication, and an open/close valve 16f provided on the partition wall 16c. The configuration thereof is such that when there is a request to engage the dog clutch 8 at the time of switching to the "connected, four-wheel drive mode," the engagement of the electronically controlled coupling 16 starts immediately without waiting for the oil in the oil chamber 16d to flow into the clutch chamber 16b via the open/close valve 16f. That is, if the engagement of the electronically controlled coupling 16 is started in a state in which the clutch chamber 16b is filled with oil, the stirring resistance due to oil is high. In contrast, if the engagement of the electronically controlled coupling 16 is started in a state in which the clutch chamber 16b is not filled with oil, the stirring resistance due to oil is low. Therefore, when switching from the "disconnected, two-wheel drive mode" to the "connected, four-wheel drive mode," since the stirring resistance due to oil due to the engagement of the electronically controlled coupling 16 is small, the rotation synchronization of the dog clutch 8 can be completed sooner.

In the first embodiment, the configuration is such that when there is a request to engage the dog clutch 8 at the time of switching to the "standby two-wheel drive mode," the engagement of the electronically controlled coupling 16 starts after waiting for the oil in the oil chamber 16d to flow into the clutch chamber 16b via the open/close valve 16f. That is, if the engagement of the electronically controlled coupling 16 is started in a state in which the clutch chamber 16b is not filled with oil, since the lubricating effect of oil cannot be obtained and friction resistance is high, the electronically controlled coupling 16 deteriorates sooner. In contrast, if the engagement of the electronically controlled coupling 16 is started in a state in which the clutch chamber 16b is filled with oil, the lubricating effect of oil can be realized. Therefore, when switching from the "disconnected, two-wheel drive mode" to the "standby two-wheel drive mode," since the lubricating effect of oil is obtained for the engagement of the electronically controlled coupling 16, durability of the electronically controlled coupling 16 is secured, even if the rotation synchronization speed is decreased.

In the first embodiment, the dog clutch 8 is disposed in an upstream position of the output pinion 10 and the bevel gear 9 provided at a drive branch position to the left and right front wheels 6 and 7. The electronically controlled coupling 16 is configured to be disposed in the position of the left rear wheel drive shaft 17, which extends to the left rear wheel 19, downstream of the bevel gear 9 and the output pinion 10 via the rear wheel output shaft 11, the propeller shaft 12 and the drive pinion 13, the ring gear 14, and the rear differential 15. With this configuration, when the "disconnected, two-wheel drive mode" is selected, the rotation of the differential case of the bevel gear 9, the output pinion 10, the rear wheel output shaft 11, the propeller shaft 12, the drive pinion 13, the ring gear 14, and the rear differential 15, is stopped. Therefore, when the "disconnected, two-wheel drive mode" is selected, an action is undertaken to stop the rotation of the drive system from the dog clutch 8 to the electronically controlled coupling 16, so that it is possible to effectively suppress friction loss and oil stirring loss, and to achieve an improvement in fuel efficiency.

Next, the effects are described. The effects listed below can be obtained with the clutch control device for a four-wheel drive vehicle according to the first embodiment.

(1) In a four-wheel drive vehicle in which, of the left and right front wheels 6 and 7 and the left and right rear wheels 19 and 20, one pair is set as the main drive wheels which are connected to a drive source (transverse engine 1) and the other pair is set as the auxiliary drive wheels which are connected to the drive source (transverse engine 1) via a clutch, and which comprises a plurality of clutches, that is, a dog clutch (dog clutch 8) and a friction clutch (electronically controlled coupling 16), which are respectively disposed separately in a drive branch-side transmission system path and in an auxiliary drive wheel-side transmission system path that sandwich a differential (rear differential 15), of a system for transmitting drive force to the auxiliary drive wheels (left and right rear wheels 19 and 20), where the dog clutch (dog clutch 8) separates the system for transmitting drive force to the auxiliary drive wheels (left and right rear wheels 19 and 20) from the system for transmitting drive force to the main drive wheels (left and right front wheels 6 and 7) by release of the clutch, and the friction clutch (electronically controlled coupling 16) allocates a portion of the drive force from the drive source (transverse engine 1) to the auxiliary drive wheels (left and right rear wheels 19 and 20) in accordance with the clutch engagement capacity, and a clutch controller (4WD control unit 34, FIG. 5) that carries out a control of starting the engagement of the dog clutch (dog clutch 8), which is in a disengaged state, after putting the dog clutch (dog clutch 8) in a rotationally synchronized state by engaging the friction clutch (electronically controlled coupling 16), when there is a request to engage the dog clutch (dog clutch 8), wherein the four-wheel drive vehicle includes a "disconnected, two-wheel drive mode" that releases the dog clutch (dog clutch 8) and the friction clutch (electronically controlled coupling 16), a "standby two-wheel drive mode" that engages the dog clutch (dog clutch 8) and releases the friction clutch (electronically controlled coupling 16), and a "connected, four-wheel drive mode" that engages the dog clutch (dog clutch 8) and the friction clutch (electronically controlled coupling 16), and wherein the clutch controller (4WD control unit 34, FIG. 5) sets the engagement start timing of the friction clutch (electronically controlled coupling 16) when a transition is made to the "connected, four-wheel drive mode" to an earlier timing compared with when a transition is made to the "standby two-wheel drive mode" when there is a request to engage the dog clutch (dog clutch 8) while in a state in which the "disconnected, two-wheel drive mode" is selected (FIG. 5). Accordingly, a balance between securing four-wheel drive performance and securing energy conservation performance can be achieved, when there is a request to engage the dog clutch (dog clutch 8).

(2) The clutch controller (4WD control unit 34, FIG. 5) sets the "disconnected, two-wheel drive mode" in a low accelerator position opening amount and high vehicle speed region, the "standby two-wheel drive mode" in a high accelerator position opening amount and high vehicle speed region, and the "connected, four-wheel drive mode" in an all accelerator position opening amount and low vehicle speed regions (FIG. 3). Therefore, in addition to the effects of (1), when switching from the "disconnected, two-wheel drive mode" to the "connected, four-wheel drive mode," since the load on the electronically controlled coupling 16 is small, the rotation synchronization of the dog clutch 8 can be completed more quickly.

Figure 6:
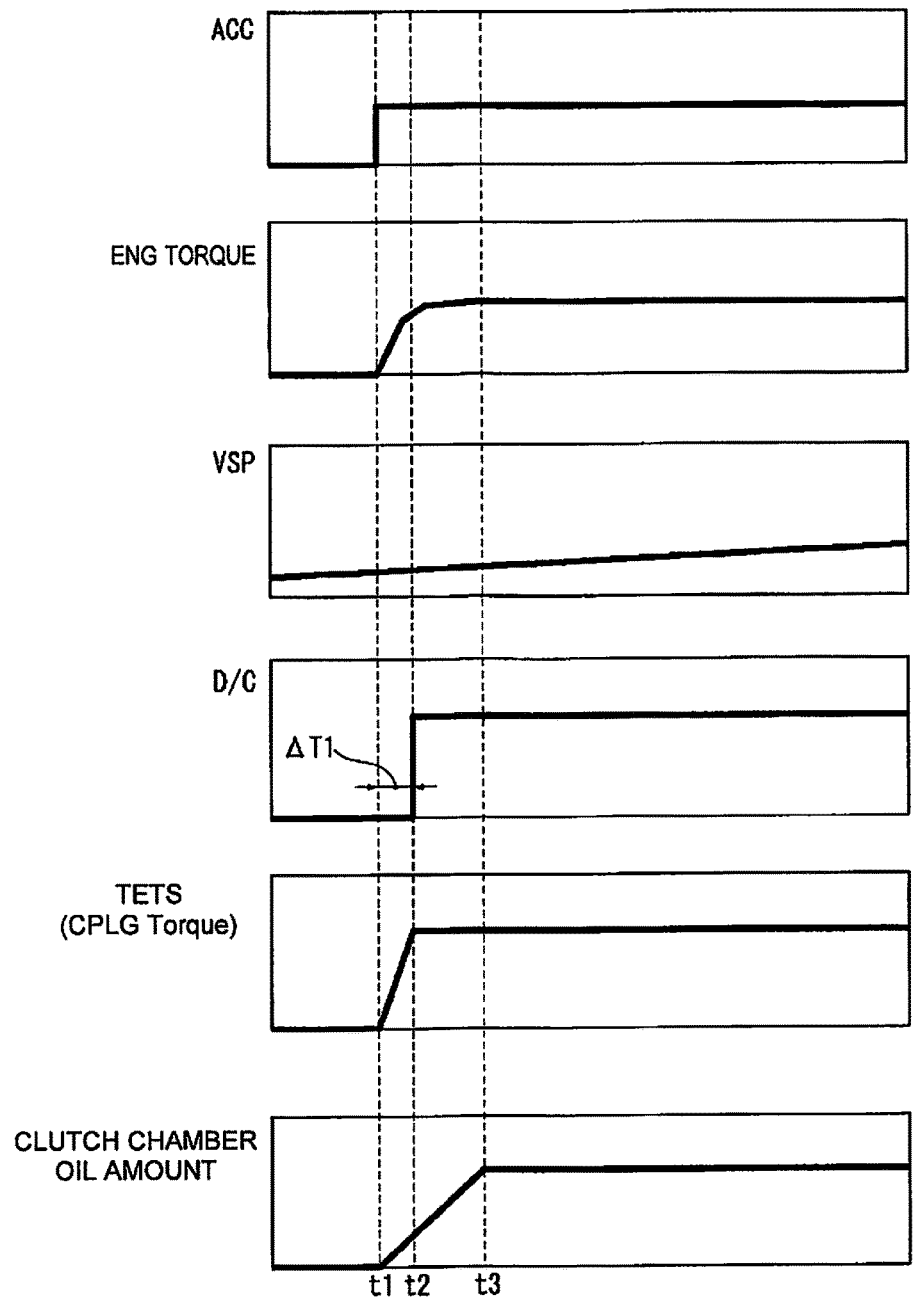
FIG. 6 is a time chart illustrating each of the features: accelerator position opening amount (ACC)/engine torque/vehicle speed (VSP)/dog clutch engagement/disengagement states/coupling transmission torque (TETS)/clutch chamber oil amount, when there is a request to engage the dog clutch at the time of switching from the "disconnected, two-wheel drive mode" to the "connected, four-wheel drive mode."

(3) The friction clutch (electronically controlled coupling 16) comprises a clutch chamber 16b that houses a multi-plate friction clutch 16a, an oil chamber 16d partitioned from the clutch chamber 16b by a partition wall 16c, an oil passage 16e that brings the clutch chamber 16b and the oil chamber 16d into communication and conveys oil from the clutch chamber 16b to the oil chamber 16d by centrifugal force, and an open/close valve 16f provided on the partition wall 16c, and the clutch controller (4WD control unit 34, FIG. 5), when there is a request to engage the dog clutch at the time of switching from the "disconnected, two-wheel drive mode" to the "connected, four-wheel drive mode," immediately starts the engagement of the friction clutch (electronically controlled coupling 16) without waiting for the oil in the oil chamber 16d to flow into the clutch chamber 16b via the open/close valve 16f (FIG. 6). Accordingly, in addition to the effects of (1) or (2), when switching from the "disconnected, two-wheel drive mode" to the "connected, four-wheel drive mode," since the oil stirring resistance due to the engagement of the friction clutch (electronically controlled coupling 16) is low, the rotation synchronization of the dog clutch (dog clutch 8) can be completed sooner.

Figure 7:
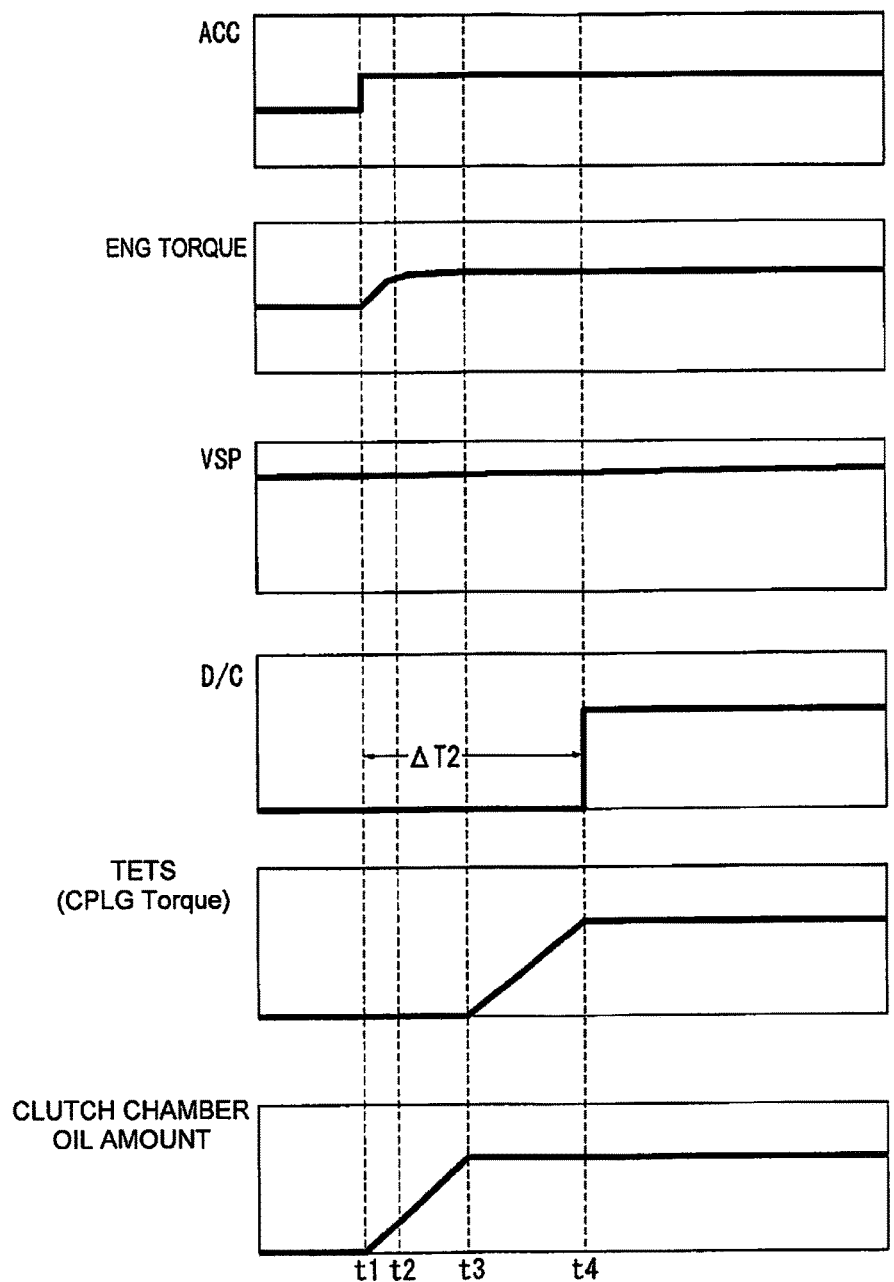
FIG. 7 is a time chart illustrating each of the characteristics: accelerator position opening amount (ACC)/engine torque/vehicle speed (VSP)/dog clutch engagement/disengagement states/coupling transmission torque (TETS)/clutch chamber oil amount, when there is a request to engage the dog clutch at the time of switching from the "disconnected, two-wheel drive mode" to the "standby two-wheel drive mode."

(4) When there is a request to engage the dog clutch (dog clutch 8) at the time of switching from the "disconnected, two-wheel drive mode" to the "standby two-wheel drive mode," the clutch controller (4WD control unit 34, FIG. 5), starts the engagement of the friction clutch (electronically controlled coupling 16) after waiting for the oil in the oil chamber 16d to flow into the clutch chamber 16b via the open/close valve 16f (FIG. 7). Accordingly, in addition to the effects of (3), when switching from the "disconnected, two-wheel drive mode" to the "standby two-wheel drive mode," since the lubricating effect of oil is obtained for the engagement of the friction clutch (electronically controlled coupling 16), the durability of the friction clutch (electronically controlled coupling 16) is ensured, even if the rotation synchronization speed is decreased. In addition, if the rotation synchronization speed is decreased, the engagement shock of the dog clutch (dog clutch 8) can be held low.

(5) The dog clutch (dog clutch 8) is disposed in an upstream position of a transfer mechanism (bevel gear 9, output pinion 10) provided at a drive branch position to the auxiliary drive wheels (left and right rear wheels 19 and 20), and the friction clutch (electronically controlled coupling 16) is disposed in the position of the drive shaft (left rear wheel drive shaft 17), which extends to the auxiliary drive wheel (left rear wheel 19), downstream of the transfer mechanism (bevel gear 9, output pinion 10) via the propeller shaft 12 and the differential (rear differential 15) (FIG. 1). Accordingly, in addition to the effects of (1)-(4), in a front wheel drive based four-wheel drive vehicle, when the "disconnected, two-wheel drive mode" is selected, it is possible to effectively suppress friction loss and oil stirring loss, and to achieve an improvement in fuel efficiency.

Second Embodiment

The second embodiment is an example in which the clutch control device is applied to a rear wheel drive based four-wheel drive vehicle, and the positional relationship of the dog clutch and the friction clutch that sandwich the differential is reversed from the positional relationship thereof in the first embodiment.

Figure 8:
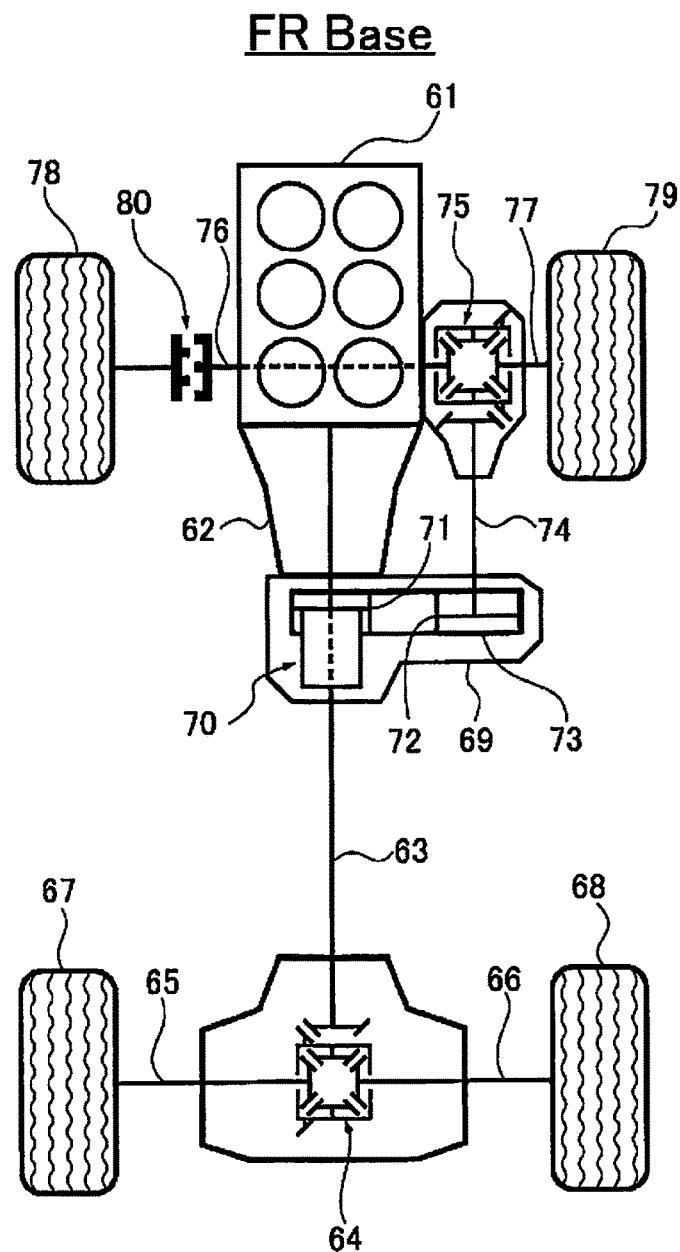
FIG. 8 is a block view of the drive system illustrating the configuration of the drive system of a rear wheel drive based four-wheel drive vehicle to which is applied the clutch control device of the second embodiment.

FIG. 8 illustrates the configuration of the drive system of a rear wheel drive based four-wheel drive vehicle to which is applied the clutch control device. The drive system configuration of the four-wheel drive vehicle will be described below based on FIG. 8.

The rear wheel drive system of the four-wheel drive vehicle is provided with a transverse engine 61 (drive source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel), as illustrated in FIG. 8. That is, the drive force that has passed through the transverse engine 61 and the transmission 62 is transmitted to the left and right rear wheel drive shafts 65, 66 via the rear propeller shaft 63 and the rear differential 64, and constantly drives the left and right rear wheels 67 and 68 while allowing a differential rotation.

In the front wheel drive system of the four-wheel drive vehicle, a transfer mechanism is configured to comprise, inside a transfer case 69, an electronically controlled coupling 70 (friction clutch), an input side sprocket 71, an output side sprocket 72, and a chain 73, as illustrated in FIG. 8. A front propeller shaft 74 that is connected to the output side sprocket 72, a front differential 75, a left front wheel drive shaft 76, a right front wheel drive shaft 77, a left front wheel 78 (auxiliary drive wheel), and a right front wheel 79 (auxiliary drive wheel) are provided. The electronically controlled coupling 70 is disposed inside the transfer case 69 in an upstream position of the input side sprocket 71 (main drive system side position).

A dog clutch 80 (dog clutch) is disposed in an intermediate position of the left front wheel drive shaft 76, which connects the front differential 75 and the left front wheel 78.

That is, the drive system is configured to be capable of selecting a two-wheel drive mode (i.e., disconnected, two-wheel drive mode) in which both the electronically controlled coupling 70 and the dog clutch 80 are disengaged. The rotation of the drive system (rotation of the front propeller shaft 74, etc.) on the downstream side of the electronically controlled coupling 70 is stopped by releasing these electronically controlled coupling 70 and dog clutch 80; it is thereby possible to suppress friction loss and oil stirring loss so that improved fuel efficiency can be realized.

Next, the synchronous operation of the dog clutch 80 will be described. The first embodiment is configured so that the dog clutch 8 is disposed in the drive branch-side transmission system path and the electronically controlled coupling 16 is disposed in the auxiliary drive wheel-side transmission system path, which sandwich the rear differential 15, of the system for transmitting drive force to the left and right rear wheels 19 and 20, which are the auxiliary drive wheels. Accordingly, when there is a request to engage the dog clutch 8, which is in a disengaged state, and an engagement control of the electronically controlled coupling 16 is carried out, the left side gear of the rear differential 15 is restricted by the rotational frequency of the left rear wheel 19. Therefore, of the rotational frequencies of the three rotating members of the rear differential 15 (the left and right side gears and the differential case), the rotational frequency of the propeller shaft 12, which is connected to the differential case, takes on the average rotational frequency of the left and right rear wheels 19 and 20 (driven wheel rotational frequency), since the rotational frequencies of the left and right side gears are restricted. As a result, when the left and right front wheels 6 and 7 are in a non-slip state, the clutch differential rotation speed ΔN of the dog clutch 8 becomes ΔN=0. However, when the left and right front wheels 6 and 7 are in a slip state, the clutch differential rotation speed ΔN, which has been decreasing with time, will reach a limit at a certain differential rotation; thereafter, the clutch differential rotation speed ΔN shifts to an increase, and the clutch differential rotation speed ΔN increases with time.

In contrast, the second embodiment is configured so that the electronically controlled coupling 70 is disposed in the drive branch-side transmission system path and the dog clutch 80 is disposed in the auxiliary drive wheel-side transmission system path, which sandwich the front differential 75, of the system for transmitting drive force to the left and right front wheels 78, 79, which are the auxiliary drive wheels. Accordingly, when there is a request to engage the dog clutch 80, which is in a disengaged state, and an engagement control of the electronically controlled coupling 70 is carried out, the differential case of the front differential 75 is restricted by the rotational frequency of the rear propeller shaft 63. Therefore, of the rotational frequencies of the three rotating members of the front differential 75 (the left and right side gears and the differential case), the rotational frequency of the left side gear will be determined by two rotational frequencies since the rotational frequencies of the right side gear (right front wheel 79) and of the differential case are restricted. As a result, when the left and right rear wheels 67 and 68 are in a non-slip state, the clutch differential rotation speed ΔN of the dog clutch 80 becomes ΔN=0. However, when the left and right rear wheels 67 and 68 are in a slip state, the clutch differential rotation speed ΔN, which has been decreasing with time will be reversed across ΔN=0 (zero); thereafter, the clutch differential rotation speed ΔN will be increased in a reversed state. The other actions are the same as the first embodiment, so that the descriptions thereof are omitted.

Next, the effects are described. The following effects can be obtained with the clutch control device for a four-wheel drive vehicle according to the second embodiment.

(6) The friction clutch (electronically controlled coupling 70) is disposed in an upstream position of a transfer mechanism (input side sprocket 71, output side sprocket 72, chain 73) provided at a drive branch position to the auxiliary drive wheels (left and right front wheels 78, 79), and the dog clutch (dog clutch 80) is disposed in the position of the drive shaft (left front wheel drive shaft 76), which extends to the auxiliary drive wheel (left front wheel 78), and is connected to the differential (front differential 75), to the transfer mechanism and the propeller shaft (front propeller shaft). Accordingly, in addition to the effects of (1)-(4) described above, in a rear wheel drive based four-wheel drive vehicle, when the "disconnected, two-wheel drive mode" is selected, it is possible to effectively suppress friction loss and oil stirring loss, so as to achieve an improvement in fuel efficiency.

The clutch control device for a four-wheel drive vehicle of the present invention was described above based on the first embodiment and the second embodiment, but specific configurations thereof are not limited to these embodiments, and various modifications and additions to the design can be made without departing from the scope of the invention according to each claim in the Claims section.

In the first embodiment, an example was shown in which a dog clutch 8 is disposed in an upstream position of the transfer mechanism as a dog clutch. However, a dog clutch may be disposed in a downstream position of the transfer mechanism, in the propeller shaft position, as the dog clutch.

In the first embodiment, an example was shown in which an electronically controlled coupling 16 is disposed in an intermediate position of the left rear wheel drive shaft 17 as the friction clutch. However, an electronically controlled coupling may be disposed in an intermediate position of the right rear wheel drive shaft as the friction clutch.

In the first embodiment, an example was shown in which the clutch control device of the present invention is applied to a front wheel drive based four-wheel drive vehicle (4WD engine vehicle) in which an engine is mounted as the drive source. In the second embodiment, an example was shown in which the clutch control device of the present invention is applied to a rear wheel drive based four-wheel drive vehicle (4WD engine vehicle) in which the left and right rear wheels are the main drive wheels. However, the clutch control device may be applied to a rear wheel drive based four-wheel drive vehicle in which the positional relationship of the dog clutch and the friction clutch is set with the same relationship as in the first embodiment. In addition, the clutch control device may be applied to a front wheel drive based four-wheel drive vehicle in which the positional relationship of the dog clutch and the friction clutch is set with the same relationship as in the second embodiment. Additionally, the clutch control device can of course be applied to other vehicles besides a 4WD engine vehicle, such as a 4WD hybrid vehicle in which an engine and an electric motor are mounted as drive sources, or a 4WD electric vehicle in which an electric motor is mounted as the drive source.

The invention claimed is:

1. A clutch control device for a four-wheel drive vehicle having a pair of main drive wheels and a pair of auxiliary drive wheels which are selectively connected to a drive source, the clutch control device comprising:

a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch;
a friction clutch operatively disposed in a transmission path between the main drive wheels and the auxiliary drive wheels to allocate a portion of the drive force from the drive source to the auxiliary drive wheels in accordance with a clutch engagement capacity of the friction clutch; and
a clutch controller operatively coupled to the dog clutch and the friction clutch to selectively carry out a control of starting an engagement of the dog clutch, which is in a disengaged state, after putting the dog clutch into a rotationally synchronized state by engaging the friction clutch, in response to a request to engage the dog clutch,
the clutch controller being programmed to selectively establish a disconnected, two-wheel drive mode in which the dog clutch and the friction clutch are disengaged, a standby two-wheel drive mode in which the dog clutch is engaged and the friction clutch is disengaged, and a connected, four-wheel drive mode in which the dog clutch and the friction clutch are engaged, and
the clutch controller being programmed to set an engagement start timing of the friction clutch when a transition is made to the connected, four-wheel drive mode to an earlier timing as compared to when a transition is made to the standby two-wheel drive mode, in response to a request to engage the dog clutch while in a state in which the disconnected, two-wheel drive mode is selected.

2. The clutch control device as recited in claim 1, wherein
the clutch controller sets the disconnected, two-wheel drive mode in a low accelerator position opening amount and high vehicle speed region, sets the standby two-wheel drive mode in a high accelerator position opening amount and high vehicle speed region, and sets the connected, four-wheel drive mode in an all accelerator position opening amount and low vehicle speed region.

3. The clutch control device as recited in claim 1, wherein
the friction clutch comprises a clutch chamber that houses a multi-plate friction clutch, an oil chamber that is partitioned from the clutch chamber by a partition wall, an oil flow channel that fluidly communicates the clutch chamber with the oil chamber and conveys lubrication oil from the clutch chamber to the oil chamber by centrifugal force, and an open/close valve provided on the partition wall, and
the clutch controller, in response to a request to engage the dog clutch at a time of switching from the disconnected, two-wheel drive mode to the connected, four-wheel drive mode, immediately starts engagement of the friction clutch without waiting for the oil in the oil chamber to flow into the clutch chamber via the open/close valve.

4. The clutch control device as recited in claim 3, wherein
the clutch controller, in response to request to engage the dog clutch at a time of switching from the disconnected, two-wheel drive mode to the standby two-wheel drive mode, starts engagement of the friction clutch after waiting for the oil in the oil chamber to flow into the clutch chamber via the open/close valve.

5. The clutch control device as recited in claim 1, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

6. The clutch control device as recited in claim 1, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

7. The clutch control device according to claim 2, wherein
the friction clutch comprises a clutch chamber that houses a multi-plate friction clutch, an oil chamber that is partitioned from the clutch chamber by a partition wall, an oil flow channel that fluidly communicates the clutch chamber with the oil chamber and conveys lubrication oil from the clutch chamber to the oil chamber by centrifugal force, and an open/close valve provided on the partition wall, and
the clutch controller, in response to a request to engage the dog clutch at a time of switching from the disconnected, two-wheel drive mode to the connected, four-wheel drive mode, immediately starts engagement of the friction clutch without waiting for the oil in the oil chamber to flow into the clutch chamber via the open/close valve.

8. The clutch control device according to claim 7, wherein
the clutch controller, in response to request to engage the dog clutch at a time of switching from the disconnected, two-wheel drive mode to the standby two-wheel drive mode, starts engagement of the friction clutch after waiting for the oil in the oil chamber to flow into the clutch chamber via the open/close valve.

9. The clutch control device according to claim 2, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

10. The clutch control device according to claim 2, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

11. The clutch control device according to claim 3, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

12. The clutch control device according to claim 3, wherein the friction clutch is disposed upstream of a transfer mechanism provided at a drive branch position to the auxiliary drive wheels, and the dog clutch is disposed in a drive shaft of one of the auxiliary drive wheels which extends from the transfer mechanism that is connected to a propeller shaft and a differential.

13. The clutch control device according to claim 4, wherein the dog clutch is disposed upstream of a transfer mechanism provided at a drive branch position to the auxiliary drive wheels, and the friction clutch is disposed in a drive shaft of one of the auxiliary drive wheels which extends from the transfer mechanism that is connected to a propeller shaft and a differential.

14. The clutch control device according to claim 4, wherein the friction clutch is disposed upstream of a transfer mechanism provided at a drive branch position to the auxiliary drive wheels, and the dog clutch is disposed in a drive shaft of one of the auxiliary drive wheels which extends from the transfer mechanism that is connected to a propeller shaft and a differential.

* * * * *